United States Patent
Akiyama

(10) Patent No.: US 10,605,689 B2
(45) Date of Patent: Mar. 31, 2020

(54) TEST PIECE CHARACTERISTIC ESTIMATION METHOD AND TEST PIECE CHARACTERISTIC ESTIMATION DEVICE

(71) Applicant: MEIDENSHA CORPORATION, Tokyo (JP)

(72) Inventor: Takao Akiyama, Tokyo (JP)

(73) Assignee: MEIDENSHA CORPORATION, Tokyo (JP)

(*) Notice: Subject to any disclaimer, the term of this patent is extended or adjusted under 35 U.S.C. 154(b) by 0 days.

(21) Appl. No.: 16/068,484

(22) PCT Filed: Dec. 13, 2016

(86) PCT No.: PCT/JP2016/087057
§ 371 (c)(1),
(2) Date: Jul. 6, 2018

(87) PCT Pub. No.: WO2017/119243
PCT Pub. Date: Jul. 13, 2017

(65) Prior Publication Data
US 2019/0017894 A1 Jan. 17, 2019

(30) Foreign Application Priority Data
Jan. 7, 2016 (JP) .................................. 2016-001626

(51) Int. Cl.
*G01M 1/10* (2006.01)
*G01M 15/02* (2006.01)
(Continued)

(52) U.S. Cl.
CPC .............. *G01M 1/10* (2013.01); *G01M 15/02* (2013.01); *G01M 15/046* (2013.01); *G01L 3/02* (2013.01)

(58) Field of Classification Search
CPC ...... G01M 15/04; G01M 15/046; G01M 3/04; G01M 17/007; G01M 15/02; G01M 15/05; G01M 1/10; G01L 3/02; H02P 1/00
(Continued)

(56) References Cited

U.S. PATENT DOCUMENTS 5,078,008 A * 1/1992 Yagi .................... G01M 15/044
73/116.05
5,656,768 A 8/1997 Abler et al.
(Continued)

FOREIGN PATENT DOCUMENTS

JP H 11194073 A 7/1999
JP 2003121307 A 4/2003
(Continued)

OTHER PUBLICATIONS

Korean Intellectual Property Office, Office Action, dated Dec. 11, 2018, 7 pages.

*Primary Examiner* — Octavia Hollington
(74) *Attorney, Agent, or Firm* — Muncy, Geissler, Olds & Lowe, P.C.

(57) ABSTRACT

A test piece characteristic estimation method includes estimating a moment of inertia of a test piece. A first transfer function G1 from a torque current command for a dynamometer to output from a shaft torque sensor is measured by vibrationally operating the dynamometer. A second transfer function G2 from the torque current command to the output of a dynamo rotation speed sensor is measured by vibrationally operating the dynamometer. A real part and an imaginary part of a ratio obtained by dividing the second transfer function G2 by the first transfer function G1 at a prescribed measurement frequency $\omega_k$ are calculated. A moment of inertia Jeg and a rotational friction Ceg are (Continued)

estimated by using the real part and the imaginary part of the ratio.

13 Claims, 6 Drawing Sheets

(51) Int. Cl.
*G01M 15/04* (2006.01)
*G01L 3/02* (2006.01)

(58) Field of Classification Search
USPC .................................................... 73/862.08
See application file for complete search history.

(56) References Cited

U.S. PATENT DOCUMENTS

| | | | |
|---|---|---|---|
| 6,775,610 B2* | 8/2004 | Akiyama | G01M 15/044 701/110 |
| 8,695,408 B2* | 4/2014 | Fuchino | G01L 3/1478 73/114.15 |
| 8,970,145 B2* | 3/2015 | Ishii | H02P 23/0004 318/400.01 |
| 9,164,005 B2* | 10/2015 | Takahashi | H02P 6/06 |
| 9,616,965 B2* | 4/2017 | Morelli | B62M 3/086 |
| 9,729,094 B2* | 8/2017 | Yamaguchi | H02P 21/05 |
| 9,739,687 B2* | 8/2017 | Akiyama | G01M 15/02 |
| 10,041,858 B2* | 8/2018 | Akiyama | G01M 15/04 |
| 10,190,944 B2* | 1/2019 | Akiyama | G01M 15/02 |
| 10,371,589 B2* | 8/2019 | Akiyama | G01L 3/04 |
| 2014/0136124 A1 | 5/2014 | Maroonian et al. | |
| 2016/0134218 A1 | 5/2016 | Yamaguchi et al. | |

FOREIGN PATENT DOCUMENTS

| | | |
|---|---|---|
| JP | 2003294550 A | 10/2003 |
| JP | 2006300683 A | 11/2006 |
| JP | 2008076061 A | 4/2008 |
| JP | 2008203051 A | 9/2008 |
| JP | 5800108 B2 | 10/2015 |
| KR | 10-2014-0060245 A | 5/2014 |

* cited by examiner

TEST PIECE CHARACTERISTIC ESTIMATION METHOD AND TEST PIECE CHARACTERISTIC ESTIMATION DEVICE

TECHNICAL FIELD

The present invention relates to a test piece characteristic estimation method and a test piece characteristic estimation device that estimate characteristics of a test piece, and especially the moment of inertia.

BACKGROUND ART

FIG. 6 is a view showing the configuration of a test system 100 of an engine 160 using a dynamometer 150. The test system 100 includes: a dynamometer 150 connected by a shaft 170 with the engine 160, which is the test piece; a throttle actuator 110 and engine control device 120 which control the output of the engine 160; and an inverter 130 and dynamometer control device 140 which control the output of the dynamometer 150. With the test system 100, the durability, fuel economy and exhaust purification performance, etc. of the engine 160 are evaluated by controlling the torque and speed of the dynamometer 150 using the dynamometer control device 140, while controlling the throttle aperture of the engine 160 using the engine control device 120. With the test system 100, a characteristic of the engine 160, especially the moment of inertia of the engine 160, may be measured prior to performing testing to evaluate the above such performance, and this may be used as a control parameter for torque control and speed control in the dynamometer control device 140.

For example, with the method shown in Patent Document 1, the output torque of the dynamometer 150 is vibration controlled while controlling the revolution speed of the engine 160 to be almost constant, and during this, data of the shaft torque generated at the rotation shaft connecting the engine 160 and dynamometer 150 and the revolution speed of the dynamometer 150 are recorded at fixed times, further, a transfer function is estimated that defines the shaft torque as input and revolution speed of the dynamometer 150 as output from this data, and the moment of inertia of the engine 160 is measured using this transfer function.

Although there is an advantage in that the above such estimation method for the moment of inertia is easy, since it is not taking account of the loss due to rotational friction in the engine 160, the estimation precision for the moment of inertia is not high. With the method shown in Patent Document 2, the rotational friction C which is substantially proportional to the revolution speed is measured in advance, and in a state blocking the fuel influx of the engine 160 and fully opening the throttle for blocking the fuel reducing the intake air resistance of the engine 160, it accelerates or decelerates by a fixed acceleration a using the dynamometer 150, the shaft torque T generated at the rotation shaft at this time is measured, and the moment of inertia J is measured using this in an equation of motion ($T=J\cdot\alpha+C$).

However, the loss due to rotational friction may also depend on the history of variation in revolution speed, not only the steady-state value for the revolution speed of the engine 160. Whereas, with the measurement method of Patent Document 2, since the history for the change in revolution speed is not being taken into consideration, it is not possible to estimate the moment of inertia with good precision.

With the invention described in Patent Document 3, the speed and shaft torque of the dynamometer when randomly exciting the torque of the dynamometer are actually measured, the frequency response $H_R$ at the frequency co is calculated using this, and the absolute value of the difference between this actually measured frequency response $H_R$ and the model board diagram data HM obtained under a predetermined model parameter $P_M$ is integrated over a predetermined frequency band, thereby calculating a performance function. With the invention of Patent Document 3, the model parameter $P_M$ such that causes the performance function to converge is obtained by using non-linear programming, and the moment of inertia is measured using this.

Patent Document 1: Japanese Unexamined Patent Application, Publication No. 2006-300683
Patent Document 2: Japanese Unexamined Patent Application, Publication No. 2003-121307
Patent Document 3: Japanese Unexamined Patent Application, Publication No. 2008-203051

DISCLOSURE OF THE INVENTION

Problems to be Solved by the Invention

According to the invention of Patent Document 3, it is possible to measure the moment of inertia with high precision; however, there is a risk of consuming time in measurement due to it being necessary to perform repeat calculations until the performance function converges, based on the non-linear programming.

The present invention has an object of providing a test piece characteristic estimation method and a test piece characteristic estimation device which can measure the moment of inertia of a test piece in a short time, while taking account of the loss due to rotational friction.

Means for Solving the Problems

A test system (for example, the test system 1 described later) according to a first aspect of the present invention includes: a dynamometer (for example, the dynamometer D described later) joined with a test piece (for example, the engine E described later) via a connecting shaft (for example, the connecting shaft S described later); a shaft torque sensor (for example, the shaft torque sensor 7 described later) which detects shaft torque generated at the connecting shaft; and a revolution speed detector (for example, the dynamo revolution speed sensor 8 or engine revolution speed sensor C described later) which detects a revolution speed of an output shaft of the test piece or the dynamometer, the method estimating the moment of inertia with an output shaft of the test piece as a rotation shaft Ta test piece characteristic estimation method of the present invention estimates the moment of inertia with the output shaft of the test piece of the rotation shaft using the test system, the method including the steps of: measuring a first transfer function (for example, the first transfer function $G1(s)$ described later) from a torque current command relative to the dynamometer until an output of the shaft torque sensor by vibrationally operating the dynamometer (for example, S1 in FIG. 2 described later); measuring a second transfer function (for example, the second transfer function $G2(s)$ or third transfer function $G3(s)$ described later) from the torque current command until an output of the revolution speed detector by vibrationally operating the dynamometer (for example, S2 in FIG. 2 described later); and calculating a value at a predetermined measurement frequency (for example, the measurement frequency $\omega_k$ described later) of a ratio obtained by dividing the second transfer function by the first transfer function, and estimating the moment of inertia using the value of the ratio (for example, S3 and S4 in FIG. 2 described later).

According to a second aspect of the present invention, in the step of estimating, it is preferable for the measurement frequency to be defined as $\omega_k$, a real part and imaginary part of the ratio at the measurement frequency $\omega_k$ to be defined as $a_k$ and $b_k$, respectively, and using the values thereof, a value of the moment of inertia Jeg of the test piece to be calculated according to the estimation formula below.

$$Jeg = -\frac{b_k}{(a_k^2 + b_k^2)\omega_k} \quad (1)$$

According to a third aspect of the present invention, in this case, it is preferable for a value of rotational friction Ceg with the output shaft of the test piece as a rotation shaft to be calculated according to the estimation formula below, using the values of the real part $a_k$ and imaginary part $b_k$ of the ratio at the measurement frequency $\omega_k$.

$$Ceg = \frac{a_k}{a_k^2 + b_k^2} \quad (2)$$

According to a fourth aspect of the present invention, in this case, it is preferable for in the step of estimating, n-number ("n" is an integer of 2 or more) of different measurement frequencies are defined as $\omega_{k\_j}$ (j is an integer from 1 to n), a real part and an imaginary part of the ratio at the respective measurement frequencies $\omega_{k\_j}$ are defined as $a_{k\_j}$ and $b_{k\_j}$, and using the values thereof, a value of the moment of inertia Jeg of the test piece is calculated according to the estimation formula below.

$$Jeg = -\frac{1}{n}\sum_{j=1}^{n}\frac{b_{k\_j}}{(a_{k\_j}^2 + b_{k\_j}^2)\omega_{k\_j}} \quad (3)$$

According to a fifth aspect of the present invention, in this case, it is preferable for a value of the rotational friction Ceg with an output shaft of the test piece as a rotation shaft is calculated using an estimation formula below, using values of the real part $a_{k\_j}$ and the imaginary part $b_{k\_j}$ of the ratio at the n-number of different measurement frequencies $\omega_{k\_j}$.

$$Ceg = \frac{1}{n}\sum_{j=1}^{n}\frac{a_{k\_j}}{a_{k\_j}^2 + b_{k\_j}^2} \quad (4)$$

According to a sixth aspect of the present invention, in this case, it is preferable for the measurement frequency to be lower than a resonance frequency of a mechanical system constituted by joining the test piece and the dynamometer by the connecting shaft.

A test piece characteristic estimation device (for example, the test system 1 described later) according a seventh aspect of the present invention includes: a dynamometer (for example, the dynamometer D described later) that is joined with a test piece (for example, the engine E described later) by a connecting shaft (for example, the connecting shaft S described later); a shaft torque sensor (for example, the shaft torque sensor 7 described later) that detects shaft torque generated at the connecting shaft; a revolution speed detector (for example, the dynamo revolution speed sensor 8 or engine revolution speed sensor C described later) that detects a revolution speed of an output shaft of the test piece or the dynamometer; a first transfer function measuring means (for example, the arithmetic device 9 described later) for measuring a first transfer function from a torque current command to the dynamometer until an output of the shaft torque sensor by vibrationally operating the dynamometer; a second transfer function measuring means (for example, the arithmetic device 9 described later) for measuring a second transfer function from the torque current command until an output of the revolution speed detector by vibrationally operating the dynamometer; and a moment of inertia estimating means (for example, the arithmetic device 9 described later) for calculating a value at a predetermined measurement frequency of a ratio obtained by dividing the second transfer function by the first transfer function, and estimating the moment of inertia using the value of the ratio.

Effects of the Invention

A first aspect of the present invention measures a first transfer function from the torque current command until the output of the shaft torque sensor, and the second transfer function from the torque current command until the output of the revolution speed detector, calculates a value at a predetermined measurement frequency of a ratio of these first and second transfer functions, and estimates the moment of inertia of the test piece using the value of this ratio. Herein, when using the equation of motion of the mechanical system made by joining the test piece and dynamometer via the connecting shaft, and when defining rotational friction as "Ceg", defining moment of inertia as "Jeg", and defining the Laplacian operator as "s", the ratio ($G2(s)/G1(s)$) of the first transfer function to the second transfer function can be expressed by an approximate function using the rotational friction and moment of inertia as in Formula (5) below. Therefore, by using the value at the measurement frequency of the above-mentioned ratio, it is possible to estimate the moment of inertia with high precision taking account of the existence of rotational friction. In addition, the influence of inverter torque control response of the inverter supplying electric power to the dynamometer according to the torque current command is expressed in each of the first transfer function and second transfer function; however, by using the ratio of these, the present invention can cancel out the influences of this inverter torque control response to estimate only the rotational friction and moment of inertia, as in Formula (5) below. In addition, since there is no necessity to use non-linear programming as in the invention of Patent Document 3 to calculate the value of the ratio of the two transfer functions, the present invention can estimate the value of the moment of inertia in a short time.

$$\frac{G2(s)}{G1(s)} = \frac{1}{Ceg + Jeg \cdot s} \quad (5)$$

With a second aspect of the present invention, when defining the value of the above-mentioned ratio at the predetermined measurement frequency $\omega k$ as $a_k + b_k \cdot I$ ("i" is an imaginary number), the above Formula (1) related to the moment is inertia is derived from the above Formula (5). Consequently, it is possible to estimate the value of the moment of inertia in a short time according to the present invention.

With a third aspect of the present invention, when defining the value of the above-mentioned ratio at the predetermined measurement frequency ωk as $a_k+b_k \cdot 1$ ("i" is an imaginary number), the above Formula (2) related to rotational friction is derived from the aforementioned Formula (5). Consequently, it is possible to estimate the value of the rotational friction in a short time according to the present invention.

With a fourth aspect of the present invention, it is possible to further improve the estimation precision of the moment of inertia, by calculating the value of the moment of inertia by averaging the values calculated under n-number of different measurement frequencies, as shown in the above-mentioned Formula (3).

With a fifth aspect of the present invention, it is possible to further improve the estimation precision of the rotational friction, by calculating the value of the rotational friction by averaging the values calculated under n-number of different measurement frequencies, as shown in the above-mentioned Formula (4).

With a sixth aspect of the present invention, it is possible to further improve the estimation precision of the moment of inertia and rotational loss, since the influence due to resonance phenomena can be avoided by making the measurement frequency lower than the resonance frequency of the mechanical system. In addition, in the case of the revolution speed detector being established as a detector that detects the revolution speed of the output shaft of the dynamometer, the above-mentioned Formula (5) becomes an approximate formula holding true in the low range. Consequently, in this case, it is possible to further improve the estimation precision of the moment of inertia and rotational friction derived based on the approximate Formula (5), by making the measurement frequency lower than the resonance frequency.

According to the seventh aspect of the present invention, the same effects are exerted as the invention of the first aspect related to the above-mentioned test piece characteristic estimation method.

PREFERRED MODE FOR CARRYING OUT THE INVENTION

Figure 1:
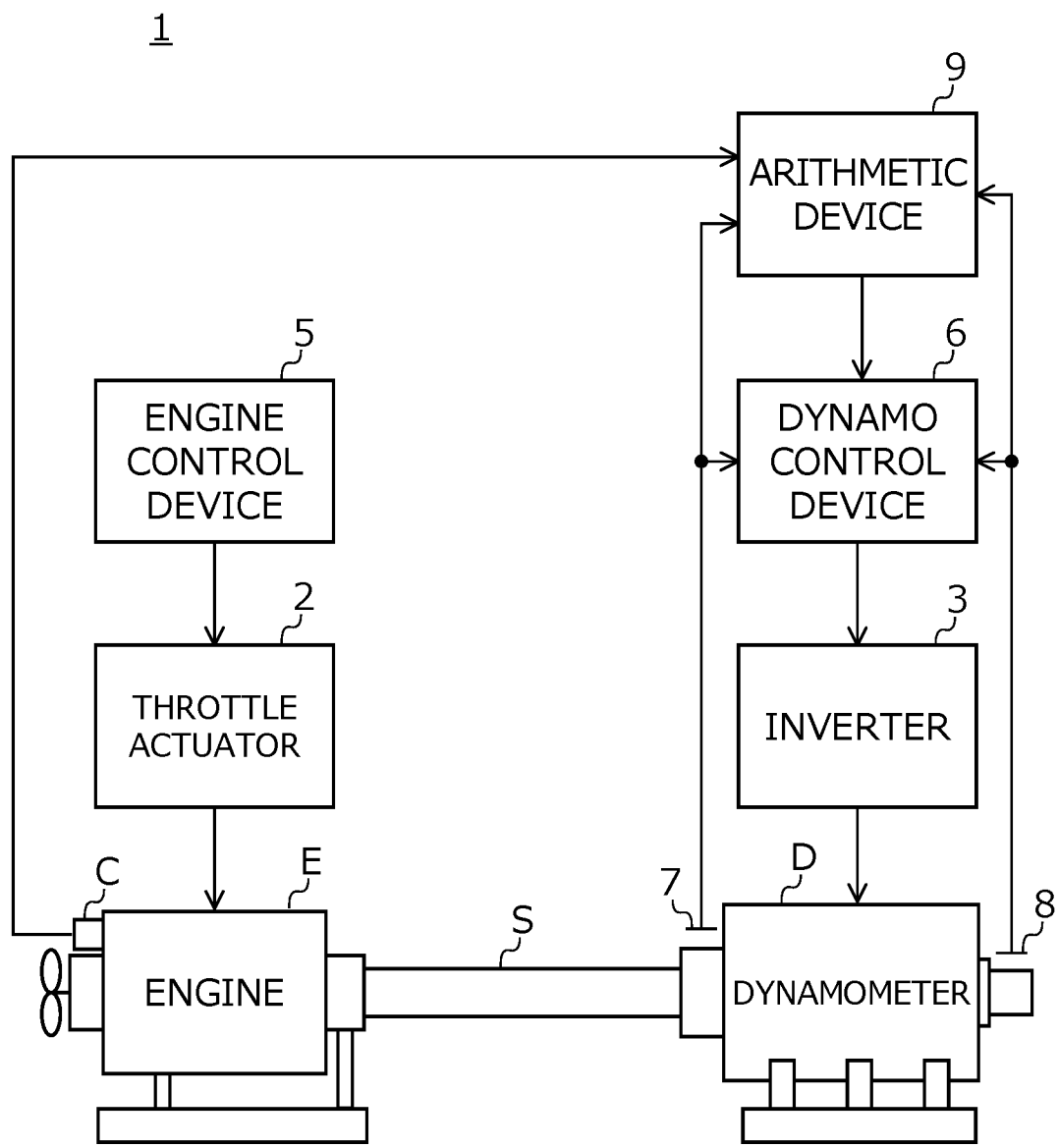
FIG. 1 is a view showing the configuration of a test system according to one embodiment of the present invention.

Hereinafter, an embodiment of the present invention will be explained in detail while referencing the drawings. FIG. 1 is a view showing the configuration of a test system 1 according to the present embodiment.

The test system 1 includes: an engine E serving as a test piece; a dynamometer D connected with this engine E via a substantially rod-shaped connecting shaft S; an engine control device 5 which controls the output of the engine E via a throttle actuator 2; an inverter 3 that supplies electrical power to the dynamometer D; a dynamometer control device 6 which controls the output of the dynamometer D via the inverter 3; a shaft torque sensor 7 that detects the torsional torque generated at the connecting shaft S (hereinafter referred to as "shaft torque"); a dynamo revolution speed sensor 8 which detects the revolution speed of the output shaft of the dynamometer D (hereinafter referred to as "dynamo revolution speed"); an engine revolution speed sensor C which detects the revolution speed of the output shaft (e.g., crank shaft) of the engine E (hereinafter, to differentiate from dynamo revolution speed, referred to as "engine revolution speed"); and an arithmetic unit 9 that performs various operations using the outputs of the shaft torque sensor 7, dynamo revolution speed sensor 8 and engine revolution speed sensor C. The test system 1 is also called a so-called engine bench system with the engine E as the testing target.

With the test system 1, tests to evaluate the durability, fuel economy and exhaust purification performance of the engine E are performed by controlling the torque and speed of the dynamometer D using the dynamometer control device 6, while controlling the throttle aperture of the engine E using the engine control device 5. Hereinafter, among the various functions realized in this test system 1, focusing on the functions of estimating a characteristic of the engine E such as the moment of inertia of the engine E and the rotational friction which is substantially proportional to the engine revolution speed, a detailed explanation will be provided centering on the configurations related to the estimation of characteristics of this engine E.

The engine control device 5 starts the engine E at a predetermined timing, and controls the output of the engine E via the throttle actuator 2 in a pre-set mode.

The dynamometer control device 6 generates a torque current command signal to the dynamometer D in a mode determined according to the test. The inverter 3 causes a torque according to this command signal to be generated by the dynamometer D, by supplying electrical power to the dynamometer D based on the torque current command signal generated by the dynamometer control device 6.

While controlling the output of the dynamometer D using the dynamometer control device 6 following the sequence explained by referencing FIG. 2 later, the arithmetic unit 9 acquires data related to the shaft torque detected by the shaft torque sensor 7 at this time, and at least any of the dynamo revolution speed detected by the dynamo revolution speed sensor 8 and the engine revolution speed detected by the engine revolution speed sensor C, and estimates the moment of inertia using this acquired data and the output shaft of the engine E as the rotation shaft, and the rotational friction, which is substantially proportional to the revolution speed. Herein, the concept of the estimation method of the present invention will be explained prior to explaining the specific sequence of estimating the moment of inertia and rotational friction by referencing the flowchart of FIG. 2.

The equation of motion for the test system configured by combining the engine E, connecting shaft S, dynamometer D, inverter 3, etc. such as that shown in FIG. 1 is represented by Formulas (6-1) to (6-3) below, when using the Laplacian operator "s".

$$Jeg \cdot s \cdot weg + Ceg \cdot weg = Teg + Tsh \quad (6\text{-}1)$$

$$Tsh = \frac{Ksh}{s} \cdot (wdy - weg) \quad (6\text{-}2)$$

$$Jdy \cdot s \cdot wdy = -Tsh + Kinv \cdot Tdy \quad (6\text{-}3)$$

In the above formula, "Jeg" is the moment of inertia (kgm$^2$) with the output shaft of the engine as the rotation shaft, "Ceg" is the rotational friction (Nms/rad) with the output shaft of the engine as the rotation shaft, "Ksh" is the shaft torque rigidity (Nm/rad), "Jdy" is the moment of inertia with the output shaft of the dynamometer as the rotation shaft, "Teg" is the engine torque (Nm), "weg" is the engine revolution speed (rad/s), "Tsh" is the shaft torque (Nm), "wdy" is the dynamo revolution speed (rad/s), "Kine" is the torque control response coefficient of the inverter, and "Tdy" is the torque current command value (Nm) of the inverter.

When solving this equation of motion (6-1) to (6-3) for shaft torque Tsh, dynamo revolution speed wdy and engine revolution speed weg, and extracting only terms proportional to the torque current command value Tdy, the following formula is derived.

$$Tsh \cong \frac{KinvKsh(Ceg + Jegs)}{CegKsh + JdyKshs + JegKshs + CegJdys^2 + JdyJegs^3} \cdot Tdy \quad (7\text{-}1)$$

$$wdy \cong \frac{Kinv(Ksh + Cegs + Jegs^2)}{CegKsh + JdyKshs + JegKshs + CegJdys^2 + JdyJegs^3} \cdot Tdy \quad (7\text{-}2)$$

$$weg \cong \frac{KinvKsh}{CegKsh + JdyKshs + JegKshs + CegJdys^2 + JdyJegs^3} \cdot Tdy \quad (7\text{-}3)$$

In the above formula, when defining the ratio of torque current command value Tdy to shaft torque Tsh as a first transfer function G1($s$), defining the ratio between torque current command value Tdy and dynamo revolution speed wdy as a second transfer function G2($s$), and defining the ratio between torque current command value Tdy and engine revolution speed weg as a third transfer function G3($s$), these first to third transfer functions can measure by acquiring the outputs of the shaft torque sensor, dynamo revolution speed sensor and engine revolution speed sensor when vibrationally operating (i.e. oscillating the torque current command value Tdy) the dynamometer.

Herein, as shown in the above Formulas (7-1) to (7-3), the first to third transfer functions are proportional to the torque control response coefficient Kinv of the inverter, respectively. Therefore, when dividing the second transfer function by the first transfer function to cancel out the influence of this torque control response coefficient Kinv, the following Formula (8-1) is derived. In addition, the low-frequency performance of Formula (8-1) is as in Formula (8-2).

$$\frac{G2(s)}{G1(s)} = \frac{1}{Ceg + Jeg \cdot s} + \frac{s}{Ksh} \quad (8\text{-}1)$$

$$\frac{G2(s)}{G1(s)} \cong \frac{1}{Ceg + Jeg \cdot s} \quad (8\text{-}2)$$

Herein, when defining the real part of a predetermined frequency $\omega_k$ (rad/s) of the ratio of the second transfer function to the first transfer function (G2/G1) as "$a_k$" and defining the imaginary part as "$b_k$", the following Formula (9) is derived from the above Formula (8-2). Herein, "i" is an imaginary number.

$$Jeg \cdot \omega_k \cdot i + Ceg = \frac{1}{a_k + b_k \cdot i} = \frac{a_k}{a_k^2 + b_k^2} - \frac{b_k}{a_k^2 + b_k^2} \cdot i \quad (9)$$

Therefore, when comparing the real part and imaginary part of Formula (9), respectively, the following Formula (10) relative to the moment of inertia Jeg and rotational friction Ceg is derived. Herein, the first and second transfer functions and the ratio of these are respectively measurable in the aforementioned way; therefore, when using the measurement results of the frequency $\omega_k$, it is possible to specify the values of the coefficients $a_k$ and $b_k$ on the right side. Consequently, when using the measurement results of the first and second transfer functions, it is possible to estimate the moment of inertia Jeg and rotational friction Ceg of the engine by the following Formulas (10-1) and (10-2).

$$Jeg = -\frac{b_k}{(a_k^2 + b_k^2)\omega_k} \quad (10\text{-}1)$$

$$Ceg = \frac{a_k}{a_k^2 + b_k^2} \quad (10\text{-}2)$$

It should be noted that the above Formulas (10-1) and (10-2) are formulas established relative to the measurement point of one frequency $\omega_k$; however, when defining this as the average value for the measurement points of a plurality of n-number (n is any integer of 2 or more) of different frequencies $\omega_{k\_j}$ ("j" is an integer between 1 and n), the following Formulas (11-1) and (11-2) are derived. It should be noted that, in the following formula, the real part and imaginary part of the ratio between the second transfer function and first transfer function at each measurement frequency $\omega_{k\_j}$ were defined as $a_{k\_j}$ and $b_{k\_j}$, respectively. Therefore, in the case of the measurement points of the first and second transfer functions being plural, it is possible to estimate the moment of inertia Jeg and rotational friction Ceg with higher precision, by using the following Formulas (11-1) and (11-2) in place of the above Formulas (10-1) and (10-2).

$$Jeg = -\frac{1}{n}\sum_{j=1}^{n}\frac{b_{k\_j}}{(a_{k\_j}^2 + b_{k\_j}^2)\omega_{k\_j}} \quad (11\text{-}1)$$

$$Ceg = \frac{1}{n}\sum_{j=1}^{n}\frac{a_{k\_j}}{a_{k\_j}^2 + b_{k\_j}^2} \quad (11\text{-}2)$$

Although a case of estimating the moment of inertia Jeg and rotational friction Ceg using the ratio of the second transfer function to the first transfer function was explained above, alternatively, even if using the ratio of the third transfer function to the first transfer function, it is possible to estimate the moment of inertia and rotational friction by almost the same sequence. More specifically, when dividing the third transfer function by the first transfer function, the following Formula (12), which is the same as the above approximate Formula (8-2), is derived. For this reason, when specifying the values of the real part $a_k$ (or $a_{k\_j}$) and imaginary part $b_k$ (or $b_{k\_j}$) using the ratio of the third transfer function to the first transfer function, it is possible to estimate the moment of inertia Jeg and rotational friction Ceg, using the above Formula (10-1) (or Formula (11-1)) and Formula (10-1) (or Formula (11-2)).

$$\frac{G3(s)}{G1(s)} = \frac{1}{Ceg + Jeg \cdot s} \quad (12)$$

Figure 2:
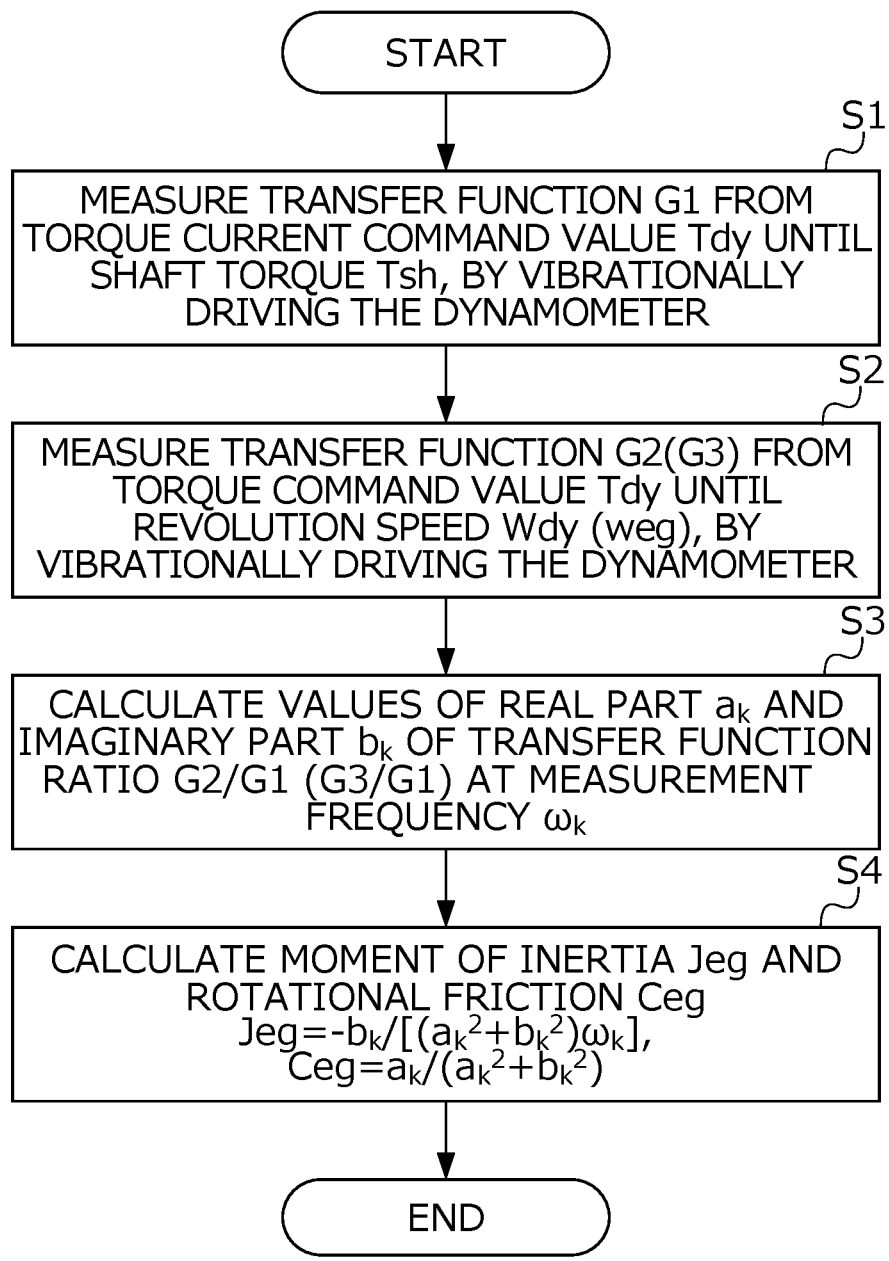
FIG. 2 is a flowchart showing a sequence of estimating a characteristic of an engine using a ratio of a transfer function.

FIG. 2 is a flowchart showing a sequence of estimating the characteristics of the engine using the ratio of transfer functions such as Formula (8-2) or Formula (12).

In S1, the first transfer function G1($s$) is measured from the torque current command value Tdy until shaft torque Tsh, by vibrationally operating the dynamometer under a predetermined excitation frequency.

In S2, the second transfer function G2($s$) (or third transfer function G3($s$)) is measured from the torque current command value Tdy until dynamo revolution speed wdy (or engine revolution speed weg), by vibrationally operating the dynamometer under a predetermined excitation frequency.

In S3, the values of the real part $a_k$ and imaginary part $b_k$ in the predetermined measurement frequency $\omega_k$, of the ratio G2/G1 (or G3/G1) obtained by dividing the second transfer function G2($s$) (or third transfer function G3($s$)) acquired in S2 by the first transfer function G1($s$) acquired in S1 are calculated. It should be noted that, in order to avoid the resonance phenomenon from influencing the estimation result, the above-mentioned measurement frequency $\omega_k$ is preferably made lower than the resonance frequency of the mechanical system constituted by joining the engine E and dynamometer D by the shaft S. In addition, since Formula (8-2) is an approximate formula holding true is a low region as mentioned above, the measurement frequency $\omega_k$ is preferably made lower than the resonance frequency also from such a viewpoint.

In S4, by substituting the values of the real part $a_k$ and imaginary part $b_k$ of the ratio G2/G2 of transfer functions calculated in S3 and the value of the measurement frequency $\omega_k$ into the aforementioned Formulas (10-1) and (10-2), the values of the moment of inertia Jeg and rotational friction Ceg of the engine are calculated.

It should be noted that, a case of estimating the moment of inertia and rotational friction based on Formulas (10-1) and (10-2) using the ratio of transfer functions at one measurement frequency $\omega_k$ is exemplified in the flowchart of FIG. 2; however, it may be estimated based on Formulas (11-1) and (11-2) in the aforementioned way. In this case, the values of the real part $a_{k\_j}$ and imaginary part $b_{k\_j}$ of the ratio G2/G1 (or G3/G1) of transfer functions should be calculated under a plurality of n-number of different measurement frequencies $\omega_{k\_j}$ (all preferably made lower than the resonance frequency in the aforementioned way), and the values of the moment of inertia Jeg and rotational friction Ceg of the engine should be calculated by substituting these into Formulas (11-1) and (11-2).

Next, the effects of the above such estimation method for the engine characteristics will be explained while comparing with the results for a case of estimating by the conventional method.

Figure 3:
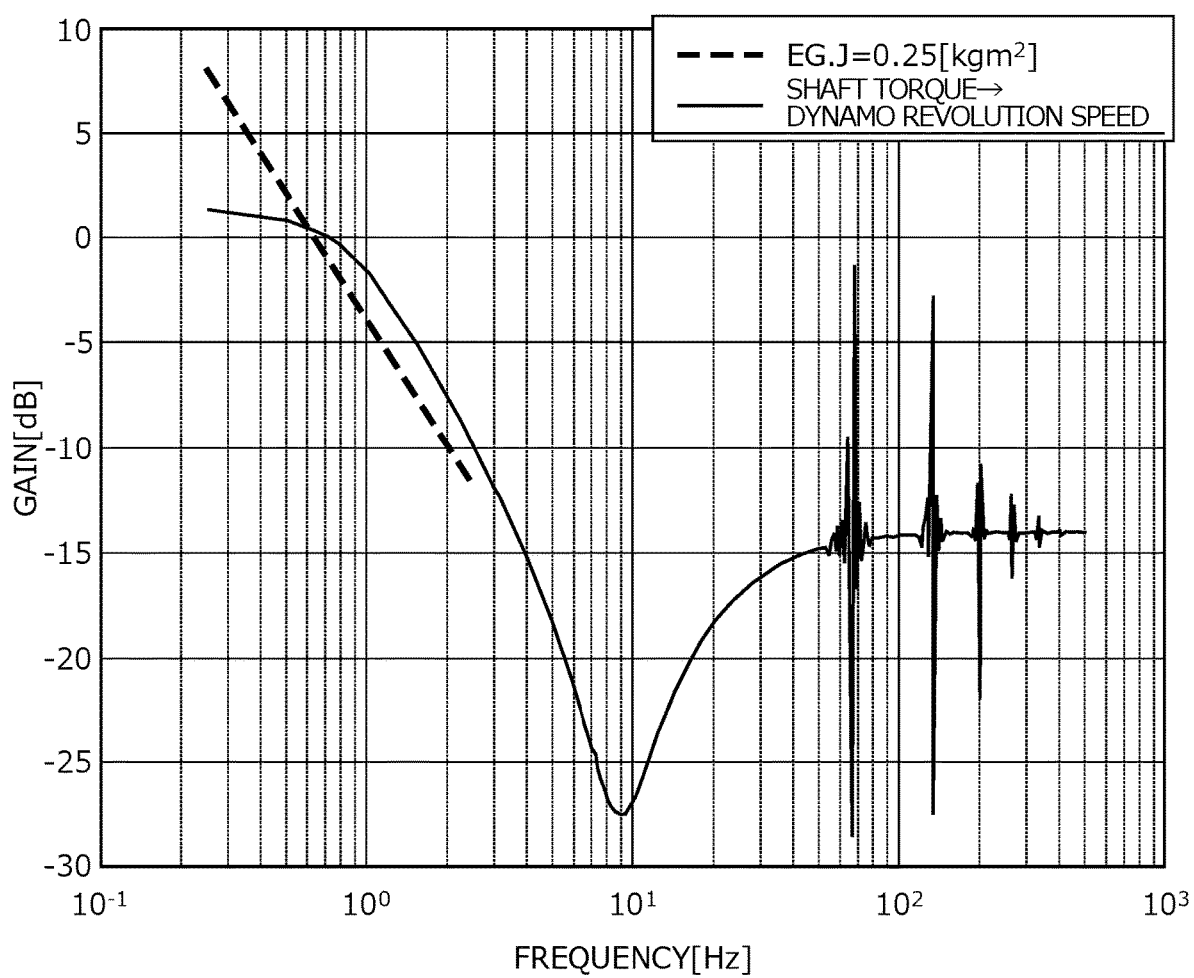
FIG. 3 is a view showing the result in a case of applying the conventional estimation method for engine specifications.

FIG. 3 is a graph showing the results for a case of applying the conventional estimation method of engine characteristics to an engine having known characteristics. Herein, conventional estimation method of engine characteristics specifically refers to the method described in Patent Document 1 (i.e. Japanese Unexamined Patent Application, Publication No. 2006-30068) by the applicants of the present application. In addition, the real value for the moment of inertia of the engine serving as the test piece is 19 (kgm$^2$), and the real value for the rotational friction of the engine is 0.64 (Nms/rad). Herein, FIG. 3 shows the results obtained from the conventional estimation method (more specifically, results obtained by substituting the moment of inertia EG.J obtained by the conventional estimation method into the above Formula (8-2)) by a bold dotted line. In addition, for comparison with this, the measurement results for the ratio of the second transfer function to the first transfer function (i.e. transfer function from the output of the shaft torque sensor until the dynamo revolution speed sensor) is shown by a fine line.

First, the rotational friction of the engine is not taken into account by the conventional estimation method. For this reason, with the conventional estimation method, it may capture a gain decline in the low region due to engine friction as that due to an increase in the moment of inertia. For this reason, the estimation result for the moment of inertia by the conventional estimation method is 0.25 (kgm$^2$), which is larger than the real value (0.19 (kgm$^2$)).

Figure 4:
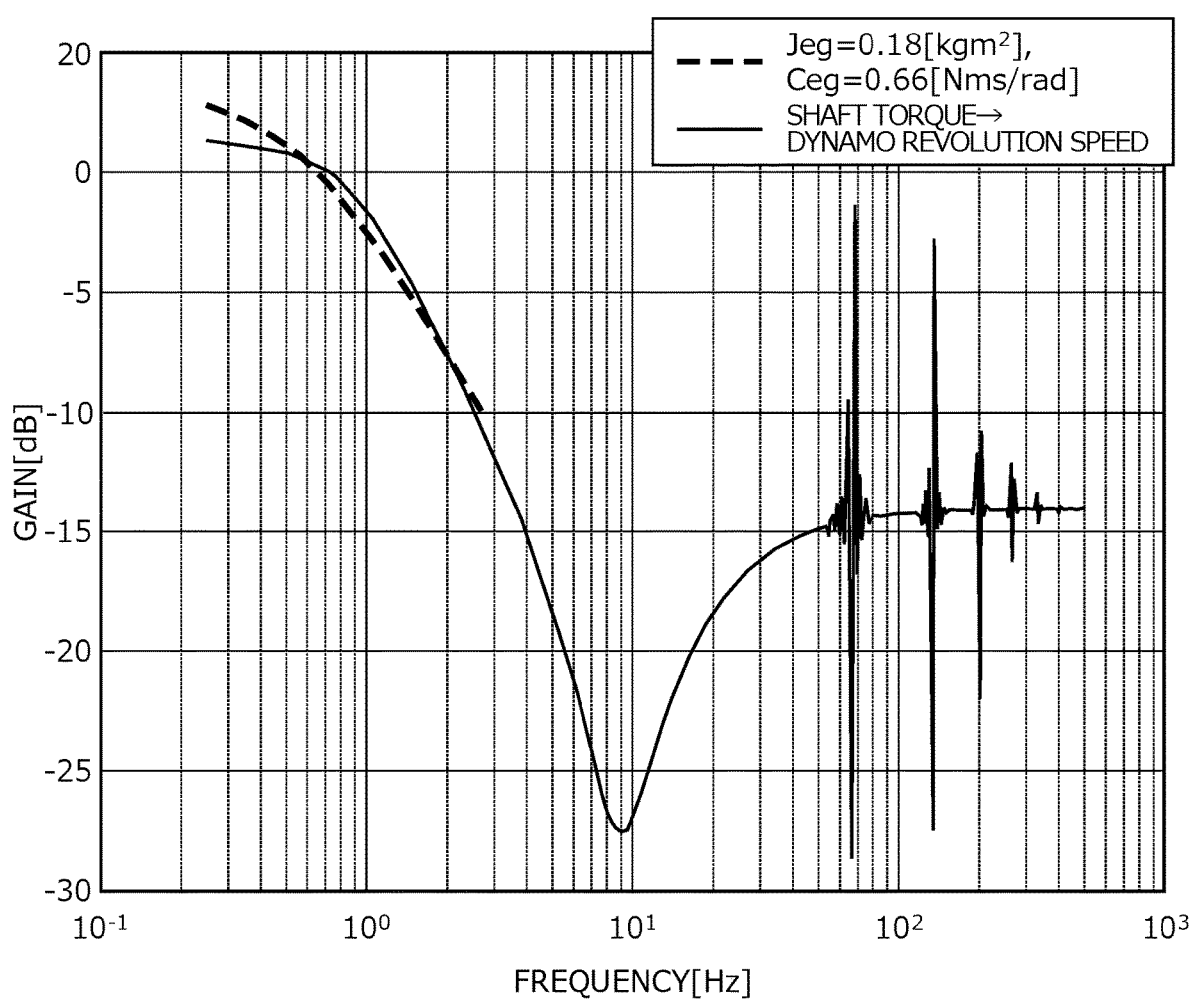
FIG. 4 is a view showing the result in a case of applying the estimation method for engine characteristics according to the above-mentioned embodiment.
Figure 5:
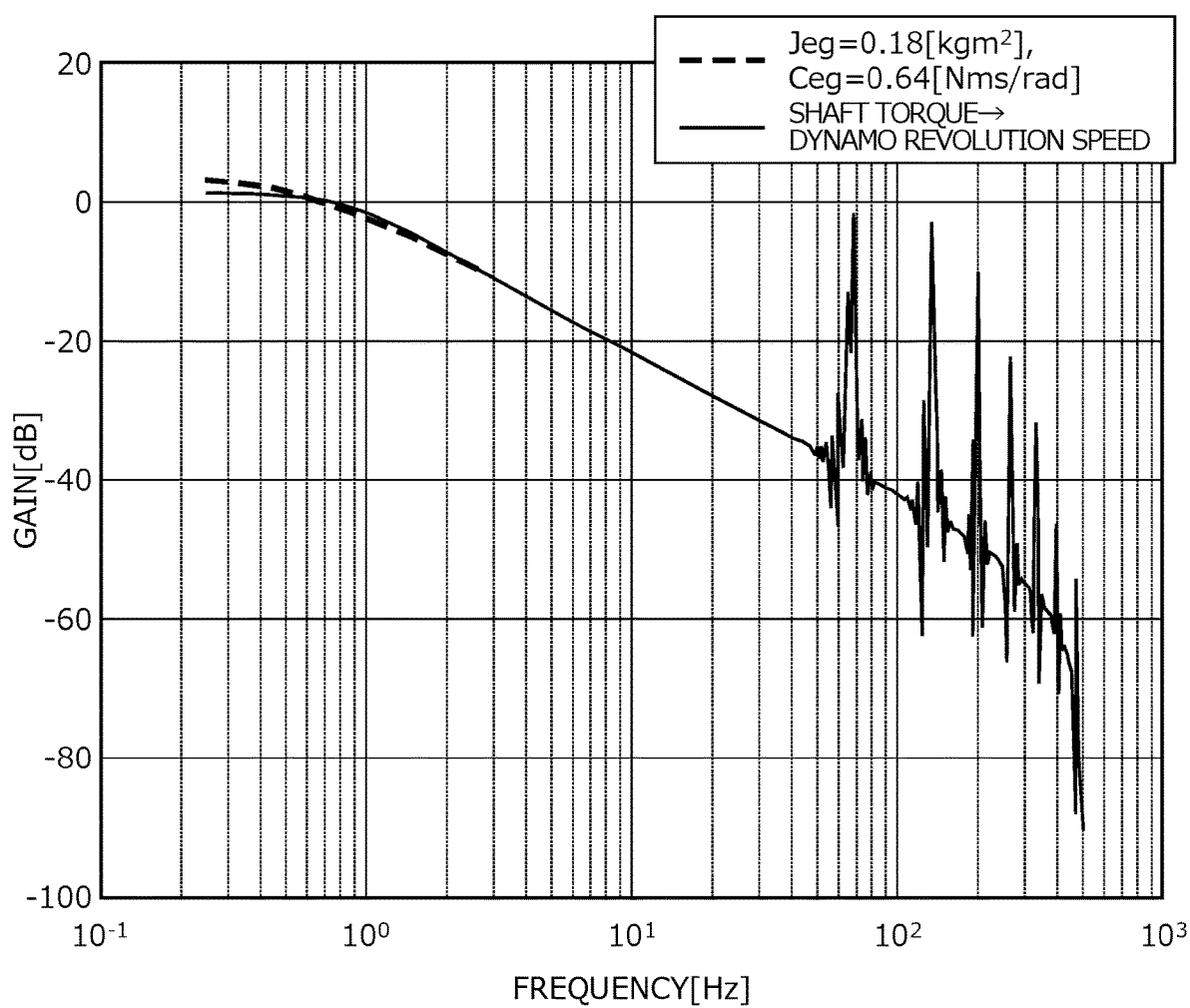
FIG. 5 is a view showing the result in a case of applying the estimation method for engine characteristics according to the above-mentioned embodiment.
Figure 6:
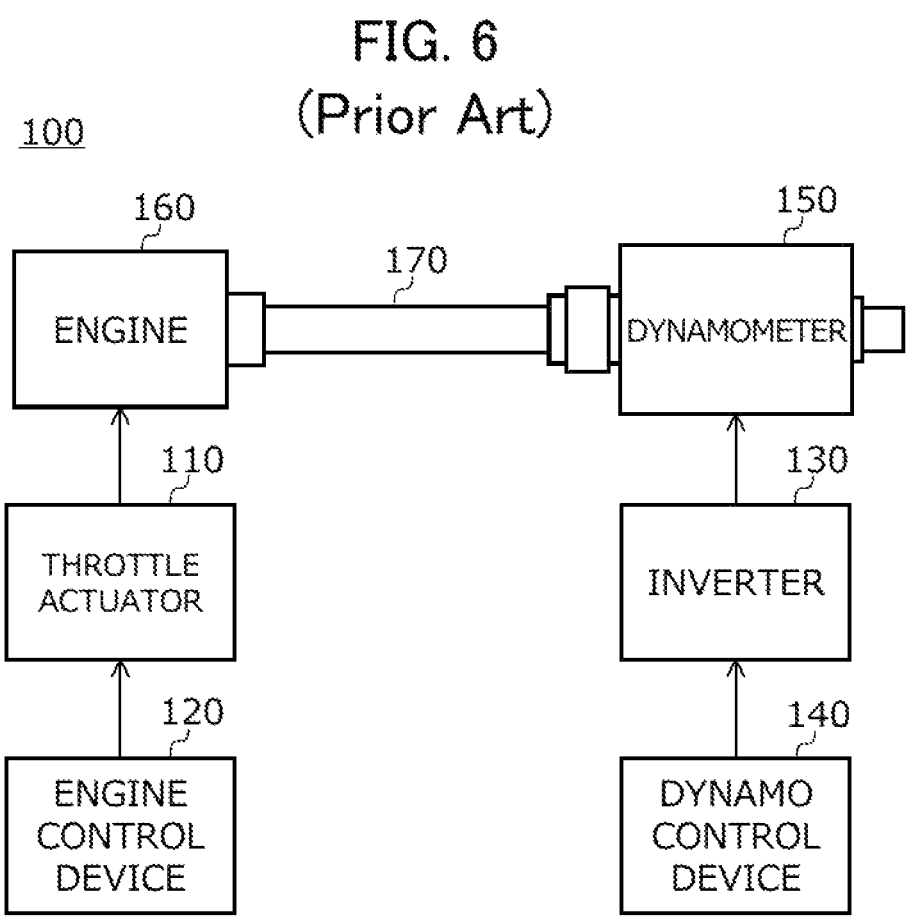
FIG. 6 is a view showing the configuration of a conventional test system.

FIGS. 4 and 5 are graphs showing results for cases of applying the estimation method for engine characteristics of the present invention to the same known engine as FIG. 3. More specifically, FIG. 4 shows the results for a case of estimating the moment of inertia Jeg and rotational friction Ceg using the measurement results of the ratio of the second transfer function to the first transfer function, and FIG. 5 shows the results for a case of estimating the moment of inertia Jeg and rotational friction Ceg using the measurement results of the ratio of the third transfer function to the first transfer function. In addition, the bold dotted lines in FIGS. 4 and 5 show the results obtained by substituting the results obtained by the respective methods into the above Formula (8-2) and Formula (12). In addition, the fine line in FIG. 4 shows the measurement results of the ratio of the second transfer function to the first transfer function, similarly to FIG. 3, and the fine line in FIG. 5 shows the measurement results for the ratio of the third transfer function to the first transfer function (i.e. transfer function from the output of the shaft torque sensor until the engine revolution speed sensor).

As shown in FIG. 4, by using the ratio of the second transfer function to first transfer function, the moment of inertia Jeg of the engine is 0.18 (kgm$^2$), and compared to the results obtained by the conventional estimation method in FIG. 3, a value sufficiently close to the real value was estimated. In addition, the rotational friction Ceg was 0.66 (Nms/rad), and thus a value sufficiently close to the real value was also estimated. In addition, as shown in FIG. 4, the bold dotted line and fine line in the low range roughly match. This indicates that the approximate Formula (8-2) is sufficiently close to the measurement result in the low range. Therefore, with the estimation method of the present invention, it is considered to appropriately distinguish the moment of inertia and rotational friction of the engine.

In addition, as shown in FIG. 5, by using the ratio of the third transfer function to the first transfer function, the moment of inertia Jeg of the engine became 0.18 (kgm$^2$), and the rotational friction Ceg became 0.68 (Nms/rad). Therefore, even when using the ratio of the third transfer function to the first transfer function, it is possible to estimate the moment of inertia and rotational friction with sufficient precision. In the above way, it is possible to measure the moment of inertia in a short time, while taking account of the loss due to rotational friction, according to the present invention.

Although an embodiment of the present invention has been explained above, the present invention is not to be limited thereto. The detailed configurations may be modified as appropriate within the scope of the gist of the present invention.

EXPLANATION OF REFERENCE NUMERALS 1 test system (test piece characteristic estimation device)
7 shaft torque sensor
8 dynamo revolution speed sensor (revolution speed detector)
9 arithmetic unit (first transfer function measuring means, second transfer function measuring means, moment of inertia estimating means)
C engine revolution speed sensor (revolution speed detector)
D dynamometer
E engine (test piece)
S connecting shaft

The invention claimed is:

1. A test piece characteristic estimation method which uses a test system comprising: a dynamometer joined with a test piece via a connecting shaft; a shaft torque sensor which detects shaft torque generated at the connecting shaft; and a revolution speed detector which detects a revolution speed of an output shaft of the test piece or the dynamometer, the method estimating a moment of inertia of the test piece the method comprising:
measuring a first transfer function from a torque current command relative to the dynamometer until an output of the shaft torque sensor by vibrationally operating the dynamometer;
measuring a second transfer function from the torque current command until an output of the revolution speed detector by vibrationally operating the dynamometer; and
calculating values of a real part and an imaginary part at a predetermined measurement frequency of a ratio obtained by dividing the second transfer function by the first transfer function, and estimating the moment of inertia using the values of the real part and the imaginary part of the ratio.

2. The test piece characteristic estimation method according to claim 1 wherein, the measurement frequency is defined as $\omega_k$, a real part and imaginary part of the ratio at the measurement frequency $\omega_k$ are defined as $a_k$ and $b_k$, a value of the moment of inertia Jeg of the test piece is calculated according to the estimation formula below $$Jeg = -\frac{b_k}{(a_k^2 + b_k^2)\omega_k}. \tag{1}$$

3. The test piece characteristic estimation method according to claim 2, wherein a value of rotational friction Ceg with the output shaft of the test piece as a rotation shaft is calculated according to the estimation formula below, using the values of the real part $a_k$ and imaginary part $b_k$ of the ratio at the measurement frequency $\omega_k$ $$Ceg = \frac{a_k}{a_k^2 + b_k^2}. \tag{2}$$

4. The test piece characteristic estimation method according to claim 1 wherein, n-number ("n" is an integer of 2 or more) of different measurement frequencies are defined as $\omega_{k\_j}$ ("j" is an integer from 1 to n), a real part and an imaginary part of the ratio at the respective measurement frequencies $\omega_{k\_j}$ are defined as $a_{k\_j}$ and $b_{k\_j}$, a value of the moment of inertia Jeg of the test piece is calculated according to the estimation formula below $$Jeg = -\frac{1}{n}\sum_{j=1}^{n}\frac{b_{k\_j}}{(a_{k\_j}^2 + b_{k\_j}^2)\omega_{k\_j}}. \tag{3}$$

5. The test piece characteristic estimation method according to claim 4, wherein a value of the rotational friction Ceg with an output shaft of the test piece as a rotation shaft is calculated using an estimation formula below, using values of the real part $a_{k\_j}$ and the imaginary part $b_{k\_j}$ of the ratio at the n-number of different measurement frequencies $\omega_{k\_j}$ $$Ceg = \frac{1}{n}\sum_{j=1}^{n}\frac{a_{k\_j}}{a_{k\_j}^2 + b_{k\_j}^2}. \tag{4}$$

6. The test piece characteristic estimation method according to claim 1, wherein the measurement frequency is lower than a resonance frequency of a mechanical system constituted by joining the test piece and the dynamometer by the connecting shaft.

7. A test piece characteristic estimation device for estimating a moment of inertia with an output shaft of a test piece as a rotation shaft, the test piece characteristic estimation device comprising: a dynamometer that is joined with a test piece by a connecting shaft;
a shaft torque sensor that detects shaft torque generated at the connecting shaft;
a revolution speed detector that detects a revolution speed of an output shaft of the test piece or the dynamometer;
a first transfer function measuring means for measuring a first transfer function from a torque current command to the dynamometer until an output of the shaft torque sensor by vibrationally operating the dynamometer;
a second transfer function measuring means for measuring a second transfer function from the torque current command until an output of the revolution speed detector by vibrationally operating the dynamometer; and
a moment of inertia estimating means for calculating values of a real part and an imaginary part at a predetermined measurement frequency of a ratio obtained by dividing the second transfer function by the first transfer function, and estimating the moment of inertia using the values of the real part and the imaginary part of the ratio.

8. A test piece characteristic estimation method which uses a test system comprising: a dynamometer joined with a test piece via a connecting shaft; a shaft torque sensor which detects shaft torque generated at the connecting shaft; and a revolution speed detector which detects a revolution speed of an output shaft of the test piece or the dynamometer, the method estimating a moment of inertia of the test piece, the method comprising:
measuring a first transfer function from a torque current command relative to the dynamometer until an output of the shaft torque sensor by vibrationally operating the dynamometer;

measuring a second transfer function from the torque current command until an output of the revolution speed detector by vibrationally operating the dynamometer; and calculating a value at a predetermined measurement frequency of a ratio obtained by dividing the second transfer function by the first transfer function, and estimating the moment of inertia using the value of the ratio, wherein, the first transfer function is defined as G1($s$), and the second transfer function is defined as G2 ($s$), a value of the moment of inertia Jeg of the test piece is calculated according to the formula below established for the moment of inertia Jeg and a rotational friction Ceg of the test piece $$\frac{G2(s)}{G1(s)} \cong \frac{1}{Ceg + Jeg \cdot s}. \quad (5)$$

9. The test piece characteristic estimation method according to claim 8 wherein, the measurement frequency is defined as $\omega_k$, a real part and imaginary part of the ratio at the measurement frequency $\omega_k$ are defined as $a_k$ and $b_k$, a value of the moment of inertia Jeg of the test piece is calculated according to the estimation formula below $$Jeg = -\frac{b_k}{(a_k^2 + b_k^2)\omega_k}. \quad (6)$$

10. The test piece characteristic estimation method according to claim 9, wherein a value of rotational friction Ceg with the output shaft of the test piece as a rotation shaft is calculated according to the estimation formula below, using the values of the real part $a_k$ and imaginary part $b_k$ of the ratio at the measurement frequency $\omega_k$ $$Ceg = \frac{a_k}{a_k^2 + b_k^2}. \quad (7)$$

11. The test piece characteristic estimation method according to claim 8 wherein, n-number ("n" is an integer of 2 or more) of different measurement frequencies are defined as $\omega_{k\_j}$ ("j" is an integer from 1 to n), a real part and an imaginary part of the ratio at the respective measurement frequencies $\omega_{k\_j}$ are defined as $a_{k\_j}$ and $b_{k\_j}$, a value of the moment of inertia Jeg of the test piece is calculated according to the estimation formula below $$Jeg = -\frac{1}{n}\sum_{j=1}^{n}\frac{b_{k\_j}}{(a_{k\_j}^2 + b_{k\_j}^2)\omega_{k\_j}}. \quad (8)$$

12. The test piece characteristic estimation method according to claim 11, wherein a value of the rotational friction Ceg with an output shaft of the test piece as a rotation shaft is calculated using an estimation formula below, using values of the real part $a_{k\_j}$ and the imaginary part $b_{k\_j}$ of the ratio at the n-number of different measurement frequencies $\omega_{k\_j}$ $$Ceg = \frac{1}{n}\sum_{j=1}^{n}\frac{a_{k\_j}}{a_{k\_j}^2 + b_{k\_j}^2}. \quad (9)$$

13. The test piece characteristic estimation method according to claim 11, wherein the measurement frequency is lower than a resonance frequency of a mechanical system constituted by joining the test piece and the dynamometer by the connecting shaft.

* * * * *